US006991212B2

(12) United States Patent
Cäsar et al.

(10) Patent No.: US 6,991,212 B2

(45) Date of Patent: Jan. 31, 2006

(54) NEEDLE VALVE

(75) Inventors: Roland Cäsar, Stuttgart (DE); Jan Gärtner, Stuttgart (DE); Frank Obrist, Dornbirn (AT); Jürgen Wertenbach, Fellbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/325,436

(22) Filed: Dec. 20, 2002

(65) Prior Publication Data

US 2003/0116734 A1 Jun. 26, 2003

(30) Foreign Application Priority Data

Dec. 22, 2001 (DE) ................................ 101 63 929

(51) Int. Cl.
*F16K 39/02* (2006.01)

(52) U.S. Cl. ................. 251/122; 251/117; 251/129.11; 251/282

(58) Field of Classification Search ................ 251/282, 251/318–334, 117, 121, 122, 129.11; 137/601.18, 137/601.19
See application file for complete search history.

(56) References Cited

U.S. PATENT DOCUMENTS

| | | | | |
|---|---|---|---|---|
| 2,731,031 | A * | 1/1956 | Newhouse | 251/324 |
| 2,994,343 | A | 8/1961 | Banks | |
| 3,255,775 | A | 6/1966 | Albro et al. | |
| 3,464,227 | A | 9/1969 | Mattheis et al. | |
| 3,563,508 | A * | 2/1971 | DeLorenzo | 251/324 |
| 3,733,050 | A * | 5/1973 | Gordon | 251/214 |
| 3,741,441 | A * | 6/1973 | Eberle | 222/135 |
| 3,874,629 | A * | 4/1975 | Fontaine | 251/61.4 |
| 3,941,508 | A * | 3/1976 | Worden | 417/46 |
| 4,075,928 | A * | 2/1978 | Bitonti | 91/29 |
| 4,374,785 | A * | 2/1983 | Wyatt | 137/601.18 |
| 4,556,193 | A | 12/1985 | Yoshiga | |
| 4,687,180 | A | 8/1987 | Simonelli et al. | |
| 5,279,328 | A * | 1/1994 | Linder et al. | 137/599.01 |
| 6,044,655 | A * | 4/2000 | Ozaki et al. | 62/205 |
| 6,220,571 | B1 * | 4/2001 | Kim et al. | 251/284 |
| 6,460,567 | B1 * | 10/2002 | Hansen et al. | 137/554 |

FOREIGN PATENT DOCUMENTS

| | | |
|---|---|---|
| DE | 42 17 835 | 12/1993 |
| DE | 44 16 279 | 11/1995 |
| DE | 195 28 726 | 3/1996 |
| DE | 44 46 605 | 6/1996 |
| DE | 196 24 901 | 8/1997 |
| DE | 296 16 690 | 3/1998 |

(Continued)

*Primary Examiner*—John Rivell
(74) *Attorney, Agent, or Firm*—Klaus J. Bach

(57) ABSTRACT

In a needle valve (1) for a high-pressure gas conduit system consisting of two units (2, 3) which are joined and one of which encloses a stepping motor (8) and the other includes gas flow passages and a gas flow control bore (17), a valve needle (10) is supported in the housing unit so as to be movable by the stepping motor and extends into the gas flow control bore (17) in the other housing unit through a guide passage (18) provided with seals to prevent gas from flowing to the housing unit including the stepping motor (8) between a region of the guide bore (18) and a low pressure region of the needle valve (1) a compensation connection is provided for relief of pressure at the sealing region (43) of the guide bore (18). The needle valve is particularly suitable as an expansion valve in an automotive $CO_2$ air conditioning system.

16 Claims, 3 Drawing Sheets

FOREIGN PATENT DOCUMENTS

| | | | |
|---|---|---|---|
| DE | 198 01 201 | | 7/1999 |
| DE | 199 18 226 | | 11/2000 |
| DE | 200 00 165 | | 6/2001 |
| DE | 199 63 549 | | 8/2001 |
| DE | 10163931 | A1 * | 7/2003 |
| EP | 0 607 953 | | 7/1994 |
| EP | WO 00/70276 | | 5/1999 |
| JP | 09 317922 | | 12/1997 |

* cited by examiner

NEEDLE VALVE

BACKGROUND OF THE INVENTION

The invention relates to a needle valve for a high pressure gas line including a housing with a stepping motor to which a needle is connected to be operated thereby for controlling the gas flow through a control passage extending through the housing.

For controlling the expansion valve of air-conditioning systems, it is known from EP 0 607 953 and WO 00/70276 to arrange the valve drive or a part of the latter, which is connected mechanically to the valve needle, in a housing part, which is connected to the housing including the valve in a gas-tight manner. This method of sealing off the inner region of the housing relative to the outside presumes that the parts of the valve drive, such as, for example, the armature winding of the latter, are not attacked by the medium flowing through the expansion valve. Moreover, a high pressure-resistant design of the drive housing requires a housing of appropriate strength.

It is known, furthermore, from U.S. Pat. No. 3,464,227 and U.S. Pat. No. 4,556,193, to connect the shank of the valve needle or of the closing body of an expansion valve of an air-conditioning system to the housing in a gas-tight manner via a bellows. A bellows-type seal however is suitable only for relatively low gas pressures and, to be arranged in the housing block of the needle valve, requires a relatively large space.

It is the object of the invention to provide a valve which is as small as possible, that is, a valve which is suitable for high pressures and has flow connections in two opposite directions and which can be used as an expansion valve of an air-conditioning system operated with carbon dioxide, that is to say for pressures up to 150 bar. Moreover, it should be simple in design, easy to manufacture, and easy to mount in the conduit system of a vehicle air-conditioning system.

SUMMARY OF THE INVENTION

In a needle valve (1) for a high-pressure gas conduit system consisting of two units (2, 3) which are joined and one of which encloses a stepping motor (8) and the other includes gas flow passages and a gas flow control bore (17), a valve needle (10) is supported in the housing unit which includes the stepping motor so as to be movable by the stepping motor and extends into the gas flow control bore (17) in the other housing unit through a guide passage (18) provided with sealing means to prevent gas from flowing to the housing unit including the stepping motor (18). The needle valve is particularly suitable as an expansion valve in an automotive $CO_2$ air conditioning system.

DESCRIPTION OF PREFERRED EMBODIMENTS

Figure 1:
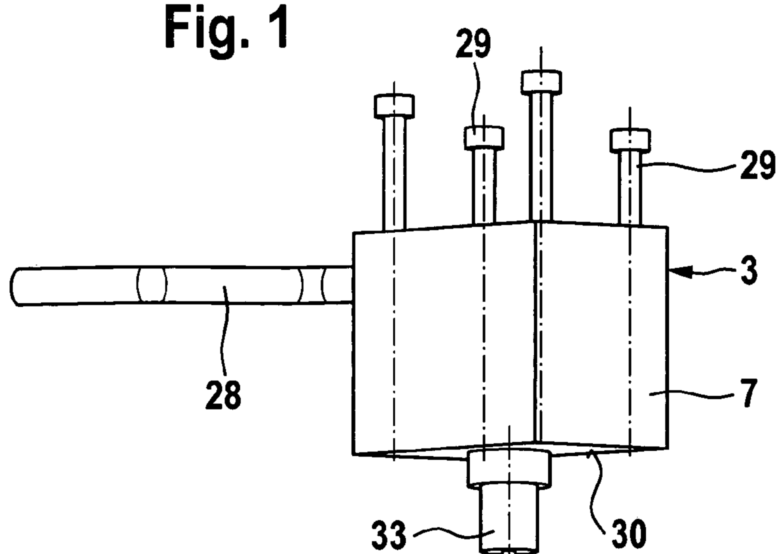
FIG. 1 is a perspective illustration of the housing of a stepping-motor drive, including a valve needle.
Figure 2:
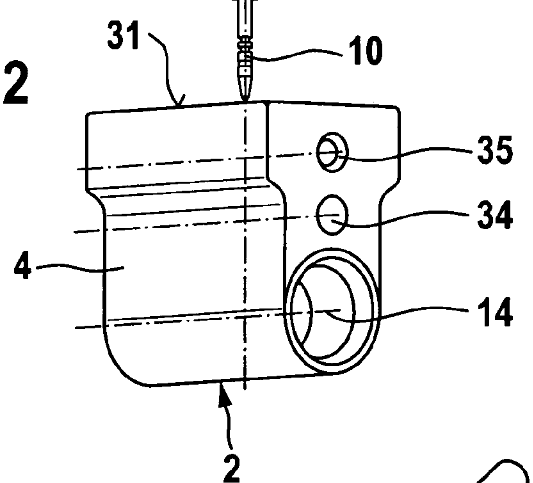
FIG. 2 is a perspective illustration of the housing of the needle valve, for mounting to the stepping motor drive housing.
Figure 3:
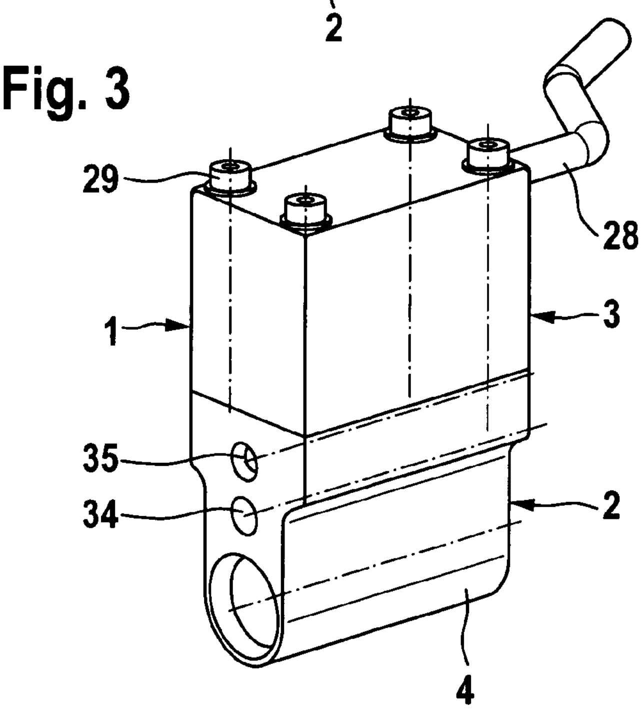
FIG. 3 is an overall perspective illustration of the needle valve with its mounting units according to FIGS. 1 and 2 mounted together.

The needle valve 1 consists of two removably interconnected housing units 2 and 3, the first of which consists of a valve housing 4 having a plurality of bores and is formed, for example, from a an extrusion molded member and is provided for the connection of pipe portions 5, 6 of a high-pressure gas conduit system. The second housing unit 3 is a drive housing 7 including a stepping motor 8 with a drive mechanism 9 for the valve needle 10 which is known per se. A drive nut, not illustrated, capable of being rotated by the motor 8, engages an external thread 11 of the valve needle 10. The valve needle is secured against rotation at its profiled upper end 12 and therefore is moved by the rotation of the nut in its longitudinal direction for valve actuation. The valve needle 10 is an integral part of the second mounting unit 3. The two mounting units 2 and 3 can be assembled in a simple way to produce the ready-to-use needle valve 1, as it will be described in more detail below.

Figure 5:
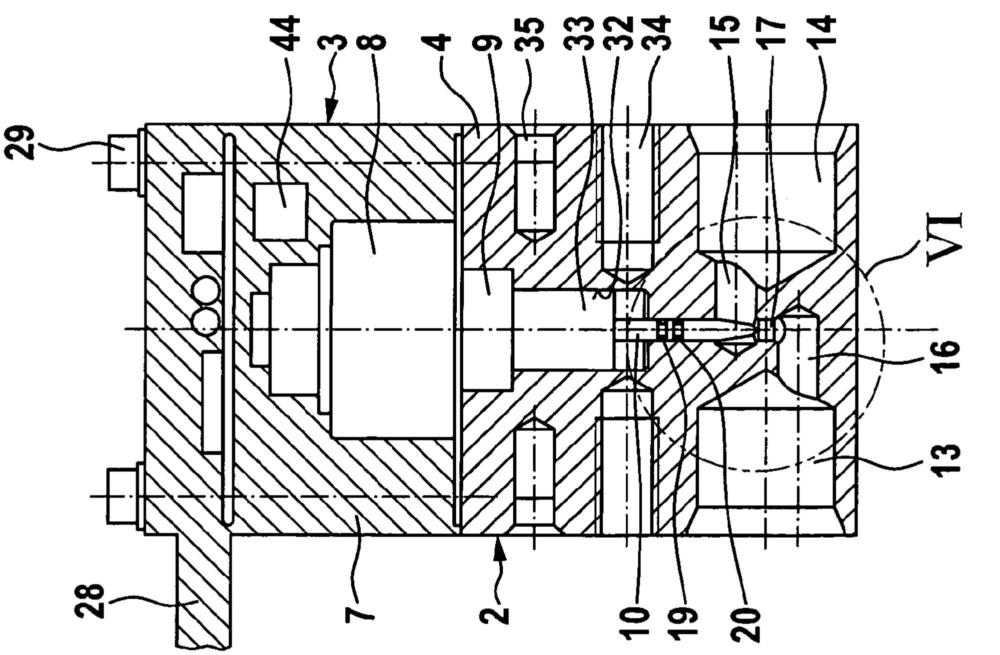
FIG. 5 is a cross sectional view of another embodiment of the needle valve.
Figure 6:
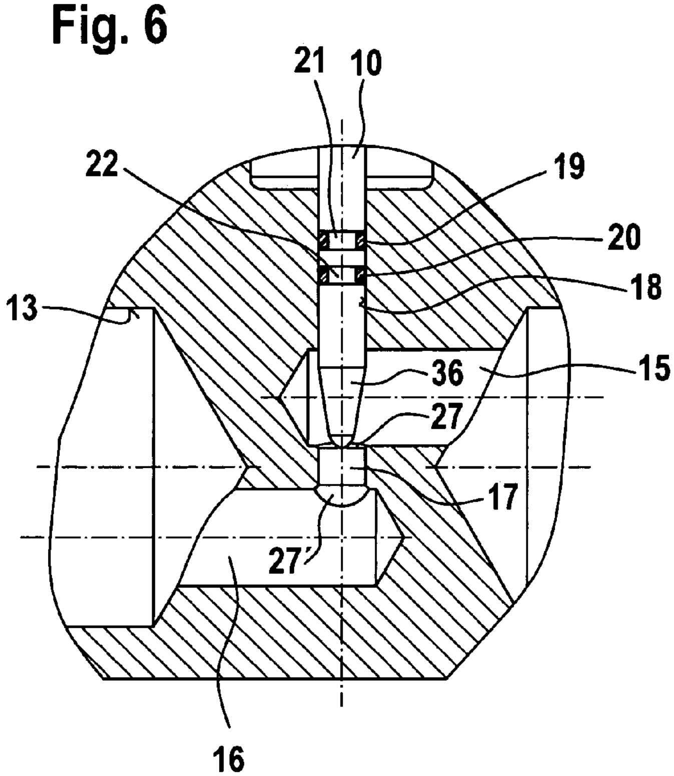
FIG. 6 is an enlarged partial illustration showing the area VI of the cross-sectional illustration of FIG. 4, with the valve needle in the uppermost position.
Figure 8:
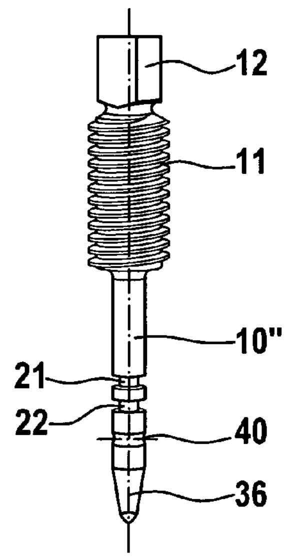
FIG. 8 shows a side view of an exemplary embodiment of a valve needle differing from the valve needle shown in FIGS. 6 and 7.

The ends of the pipe portions 5, 6 are held in a gas-tight manner in pipe connection bores 13, 14 of the housing 4 by soldering according to the exemplary embodiment shown in FIG. 5. The connecting bores 13, 14 may also form a spigot receptacle for a releasably insertable pipe spigot of a pipe coupling with sealing rings, such as is described in detail in patent application DE 101 63 931.7. The connection bores 13, 14 merge into short valve conduits 15, 16 in the form of blind holes. These have a substantially smaller diameter and are transversely offset relative to one another, so that they overlap one another that is extend parallel to each other. A valve bore 17 forms a right-angled cross connection between these valve conduits. However, instead, the valve bore 17 may extend at an inclination to the valve conduits 15, 16, for example in order to eliminate noise caused by the right-angled change in the direction of the flow.

Figure 4:
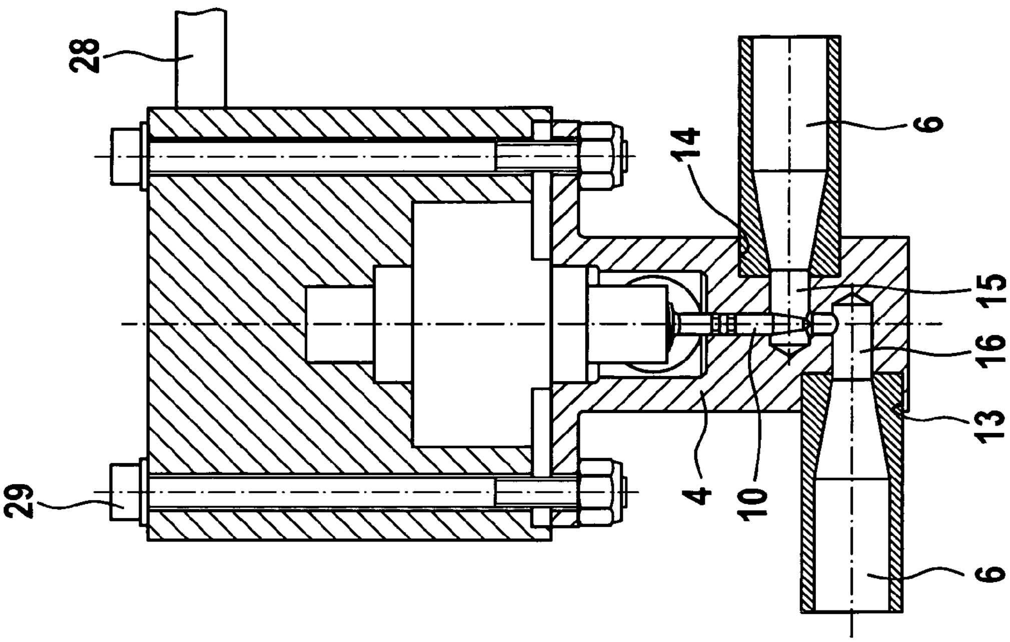
FIG. 4 is a cross sectional view of the needle valve according to FIG. 3.

In the exemplary embodiment according to FIG. 4, the transverse offset with coaxial connecting bores 13, 14 is achieved in that the valve conduits are disposed eccentrically to connecting bores 13, 14, that is, they are axially offset. In the exemplary embodiment according to FIG. 5, the valve conduits 15, 16 extend coaxially with the connecting bores 13, 14 provided for the pipe portions 5, 6, but the connecting bores are axially offset relative to one another. The capacity for the simpler production of coaxial bores 13, 16; 14, 15 has the disadvantage, however, that the housing 4' cannot be mounted in different angular positions in relation to the axes of the pipe portions 5, 6.

The valve needle 10, which is drive-connected to the stepping motor 8, extends into the housing 4 through a guide bore 18 extending co-axially with the valve bore 17. The stepping motor makes it possible to adjust the valve needle continuously in the guide bore 18, so that the free opening cross-section of the valve bore 17 can be changed continuously between a minimum and a maximum value.

The inner region of the housing 4 formed by the bores 15, 16 and the central guide bore 18 are sealed relative to the outside in the region of the guide bore 18 by providing at least one sealing ring 19, 20.

In order to achieve good sealing with respect to carbon dioxide, which is under high pressure, at a relatively low outlay in structural terms without excessive frictional resistances occurring during the adjusting movement of the valve needle, two O-rings 19, 20 are provided at a distance from one another and are preferably held in peripheral grooves 21, 22 of the valve needle 10.

Figure 7:
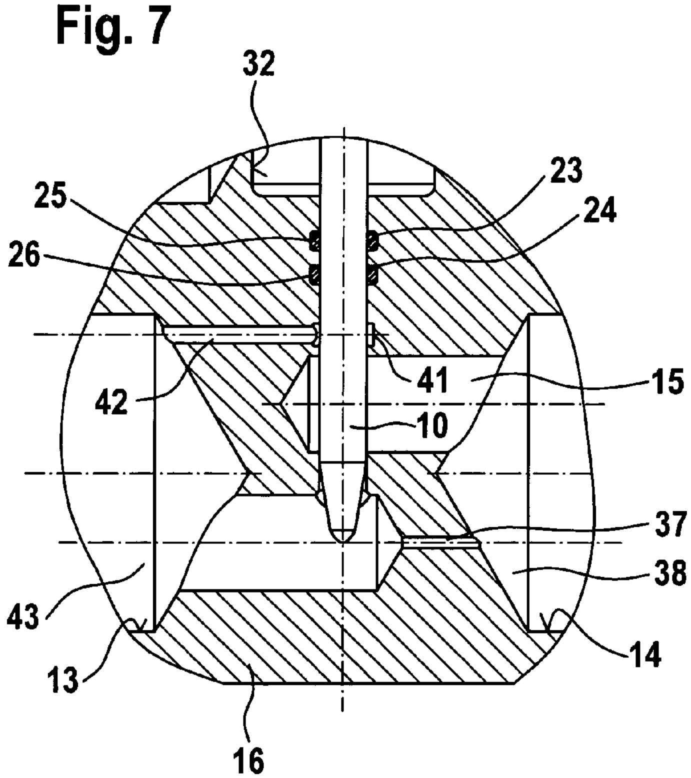
FIG. 7 is an illustration corresponding to that of FIG. 6, but with a modified version of the housing block and with the valve needle in the closing position.

In the exemplary embodiment according to FIG. 7, the receiving grooves 23, 24 for two O-rings 25, 26 are provided in the guide bore 18, but this leads to higher expenses for the machining of the valve housing 4 and to a somewhat larger diameter of the O-rings 25, 26.

The sealing in the region of the guide bore 18 by means of O-rings 19, 20; 25, 26 also has the advantage of a substantially easier mounting of the needle valve 1 in a gas conduit system for example in the engine compartment of a motor vehicle, in that, during the mounting of the gas conduit system, first only the valve housing 4 has to be inserted between two pipe portions 5, 6 and the needle valve 1 can then be completed by mounting the drive housing 7 already connected to an electrical lead 28 in place and, at the same time, inserting the valve needle 10 into the guide bore 18. Finally, a firm connection is established by four screws 29 which extend through corner regions of the drive housing 7 into correspondingly arranged threaded holes of the housing 4, so that the flange surfaces 30, 31 of the two housings 4, 7 come to bear firmly against one another.

The guide bore 18 may extend up to the flange surface 31 facing the drive housing 7, which thus supports and guides the valve needle 10. As shown in the exemplary embodiment, the valve housing 4 may be provided with a socket 32 of larger diameter for receiving a cylindrical housing extension 33 of the drive housing 7, the housing extension containing part of the drive mechanism 9 of the stepping motor 8. The latter version is preferred, since the drive housing 7 can thereby be smaller. Sufficient space for a correspondingly larger socket 32 is available in the valve housing 4 if engagement bores 34, 35 are provided in the valve housing 4 for the fastening of the side flange of a pipe coupling adjoining the pipe portions, according to patent application DE 101 63 931.7.

In order to provide for a small sealing surface area, that is a small area along which frictional sealing contact is necessary, so that the stepping motor, together with its housing 7 surrounding the drive system, can also be made small, the valve needle 10 and consequently also the guide bore 18 are provided with as small a diameter as possible. If there is no need for a completely leak-tight closing of the needle valve 1, for example when it is used as a controllable expansion valve of a $CO_2$ air-conditioning system, the guide bore 18 preferably also has as small a diameter as possible like the valve bore 17. For providing a sealing seat by means of a conical end region 36 of the valve needle 10, the guide bore 18 may only be larger in diameter by 15 to 20% than a corresponding diameter of the cylindrical head part of the valve needle 10.

Since there is no need for a complete closing of the expansion valve if a needle valve 1 is used as an expansion valve of an air-conditioning system, the diameter of the valve bore 17 and consequently also of the guide bore can be as shown in the exemplary embodiment of FIG. 7 where a part-flow is conducted past the valve bore 17 through a bypass passage 37. In this connection, for example, the bore of the valve conduit 16 located at the low-pressure side extends co-axially with a substantially smaller diameter, into the bottom area 38 of the opposite connecting bore 14 (FIG. 4).

Figure 9:
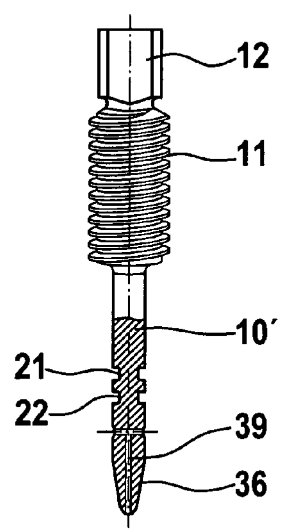
FIG. 9 shows a further exemplary embodiment of a valve needle.

Furthermore, a bypass connection 42 may also serve for relieving the sealing region of the guide bore 18, in that, within the guide bore 18 (FIG. 7) and/or at a corresponding location an the valve needle 10", a peripheral groove 40 or 41 which is in communication via a bore 42 with the end area 43 of the low pressure connection bore 13. Instead, or in addition, a bypass passage 39 may also extend through the valve needle 10', as shown in the cross-sectional illustration of FIG. 9.

The diameter of the valve bore 17 and consequently also that of the guide bore 18 can further be made as small as possible if the valve needle 10 can be moved with its tapered front end 36 fully out of the valve bore 17, so that the latter can be completely opened.

Finally, the through-flow of the valve bore 17 can be improved by a conical or curved design of its orifice edges 27, 27', so that a better utilization of the cross-sectional size of the valve bore 17 is obtained. Also, as a result, noises caused by the throttling of the flow in the region of the valve duct 17 can be reduced or eliminated in this way.

For pipe systems which, together with their electrical connections 28, may be damaged, for example, due to a crash, so that the out-flowing medium could cause damage, the housing 7 of the stepping motor 8 may include an emergency power-generating system 44 with an electrical energy storage and with control electronics, which are programmed, in the event of an interruption in a main power supply for the stepping motor 8, to energize the motor for closing the needle valve 1.

What is claimed is:

1. A needle valve for a high-pressure gas conduit system, including a motor housing (7), a valve housing (4) having connection bores (13, 14) for receiving pipe portions (5,6) of the gas conduit system, a valve bore (17) extending between the connection bores (13, 14) and a guide bore (18, 32) coaxially formed in said valve housing (4) with said valve bore (17), a valve needle (10) with a cylindrical needle shaft part supported in said motor housing (7) and extending into said valve bore (17) in said valve housing (4) and connected to a stepping-motor drive (8, 9) disposed in said motor housing (7), and sealing means (19, 20, 23, 24) extending around said needle in the area of said guide bore (18, 32) for preventing gas from flowing along said cylindrical needle shaft part to said motor housing (7), said motor housing (7) being sealed to said valve housing (4), and a compensation connection (42) extending between a region (41) of said guide bore (18) surrounding the valve needle (10) and a low pressure region (43) of the needle valve (1) for the relief of pressure at the sealing region of the guide bore (18), the region (41) being arranged between the at least one sealing means (23–26) and the adjacent valve conduit (15).

2. A needle valve according to claim 1, wherein said connection bores (13, 14) extend coaxially and are blind-hole bores for receiving the pipe portions at opposite sides of the valve housing (4), said connection bores (13, 14) being extended via axially parallel mutually spaced extension bores (15, 16) of smaller diameter, and said valve bore (17) extending through a wall between said extension bores (15, 16).

3. A needle valve according to claim 2, wherein said coaxial connecting bores (13, 14) form a spigot socket for the engagement of a coupling spigot of a releasable pipe coupling, said coupling spigot including sealing means.

4. A needle valve according to claim 3, wherein at least one bore (34, 35) for the engagement of fastening means of a side flange of a pipe coupling is provided in the valve housing parallel to the respective spigot socket.

5. A needle valve according to claim 1, wherein the valve housing (4) is formed from an extrusion-molded body having a cross-section which widens from a narrow region adjacent the connecting bores (13, 14) in the direction toward a flange surface (31) when the valve housing is connected to the housing (7) of the stepping motor (8).

6. A needle valve according claim 1, wherein the motor housing (7) is connected releasably to the valve housing (4) 30 that the housings form a mounting unit (2, 3), of which the valve housing includes pipe portions (5, 6) of the gas conduit system and the motor housing (7) includes electrical leads and the stepping motor (8), and the valve needle (10) is supported by the motor housing and is engaged with the drive mechanism of the stepping motor.

7. A needle valve according to claim 1, for an air-conditioning system operated with carbon dioxide, wherein the guide bore (18) serving for sealing contact with the valve needle (10) has at least approximately the same diameter as the valve bore (17).

8. A needle valve according to claim 2, wherein said sealing means is at least one O-ring (19, 20; 25, 26).

9. A needle valve according to claim 8, wherein the at least one O-ring (19, 20) is held in a groove (21, 22) surrounding the valve needle (10).

10. A needle valve according to claim 8, wherein the valve needle (10) is surrounded by two sealing rings (19, 20; 25, 26).

11. A needle valve according to claim 1, wherein, with the valve opened to the maximum, the front end (36) of the valve needle (10) is at a distance from the valve bore (17), so that the flow cross section of the latter is completely open.

12. A needle valve according to claim 2, wherein a bypass passage (37) of smaller cross-section is provided parallel to the valve bore (17).

13. A needle valve according to claim 1, wherein the compensating connection (42) emanates from a peripheral groove (40) provided in the valve needle (10).

14. A needle valve according to claim 1, wherein the compensating connection extends to the low-pressure region (16) of the needle valve (1) via a transverse bore and a central bore (39) of the valve needle (10').

15. A needle valve according to claim 1, wherein said bypass passage (37) extends between said extension bore (16) located on the low-pressure side into a bottom space (38) of the connecting bore (14) located on the high-pressure side.

16. A needle valve according to claim 1, wherein the motor housing (7) includes an electrical energy storage device and control electronics for providing emergency power in the event of an interruption in a main power supply to the stepping motor (8) for the purpose of closing the needle valve (1).

* * * * *